March 22, 1960

R. D. WALSH 2,929,976

FAST-REVERSING MOTOR CONTROL

Filed Feb. 28, 1958

INVENTOR.
RICHARD D. WALSH
BY

# United States Patent Office 2,929,976
Patented Mar. 22, 1960

2,929,976

FAST-REVERSING MOTOR CONTROL

Richard D. Walsh, Shelby, Ohio, assignor to American Machine & Foundry Company, a corporation of New Jersey Application February 28, 1958, Serial No. 718,164

10 Claims. (Cl. 318—207)

This invention relates to fast-reversing systems for single-phase motors of the type having a main running winding and an auxiliary starting winding, the latter being displaced in space with respect to the former. Such motors usually employ a phase-shifting reactance and a speed-responsive cut-out switch connected with the starting winding, as is well known in the prior art. More particularly, this invention relates to mechanical motor-shaft braking means combined with a control and reversing circuit in such a way that the brake is automatically applied for an interval of time during the sequence of switching steps involved in reversal of the motor from full speed in one direction to full speed in the opposite direction.

It is an object of this invention to provide a reversal system which can be used in conjunction with standard commercially available electric motors without requiring alteration of the motor structure in any way.

It is a further object of this invention to provide a reversing system all the components of which are standard commercially available parts.

It is another important object of the present invention to provide a motor-reversing circuit of the relay-operated type in which the relay contacts are not required to carry electric currents which are greatly in excess of normal running currents. In carrying out this object of the invention it is particularly important to provide a circuit in which the relay contacts are not required to carry excessive currents flowing in the motor windings as in the case of prior-art circuits wherein the motor is braked electrically by reversal of the winding while it is running at full speed, such braking being commonly known as "plugging." In a circuit according to the present invention, plugging is not employed, except perhaps for brief intervals at greatly reduced speeds, nor are any of the motor windings short-circuited. This feature of the invention, which avoids the necessity of using relays having heavy contacts, not only reduces the initial expense of the components and wear thereof, but serves the additional purpose of permitting the use of smaller relay components which are capable of more rapid cycling so as to reduce to a minimum the time required for reversing the motor.

Another important object of the invention is to provide a system in which the starting winding circuit is not reversed across the power line, but rather the main winding is reversed which winding draws less current than the starting winding so that the relays required to reverse this winding can be made smaller.

Still another object of the present invention is to provide reversing means wherein the reversing takes place in timed succession, the main winding being de-energized, and the mechanical braking applied to the motor shaft at least long enough to slow the motor down until the speed-responsive cut-out switch recloses the starting circuit. At this time the main winding is then reenergized in the reverse direction, i.e. connected back across the line with its polarity reversed with respect to the polarity of the starting winding, which remains unreversed across the line.

Another object of the present invention is to provide means for reversing a motor without necessity of opening the relatively heavy main line controller supplying power to the entire motor circuit.

It is another object of this invention to provide the novel combination of a normally-applied brake having solenoid brake-retracting means connected in parallel with main winding of the motor and which operates in such a way that the brake is automatically applied to the shaft whenever the main winding of the motor is de-energized. Conversely, when this winding is re-energized the brake is automatically retracted so as to again permit free rotation of the motor shaft. In this system, transformer action between the starting winding and the main winding will not tend to energize the brake solenoid as the motor slows up because the speed-responsive cut-out switch remains open at least until the shaft speed is greatly reduced. Thus until the switch closes neither winding is energized from the line. About the time the speed-responsive cut-out closes, the reversing mechanism operates to reconnect the main winding across the line in the opposite direction. Excessive currents will not flow in the main winding in view of the fact that the rotation of the motor by this time is greatly slowed before the main winding is reverse-connected to the line.

Other objects and advantages of the invention will become apparent in the following discussion of the drawings, wherein.

Figure 1:
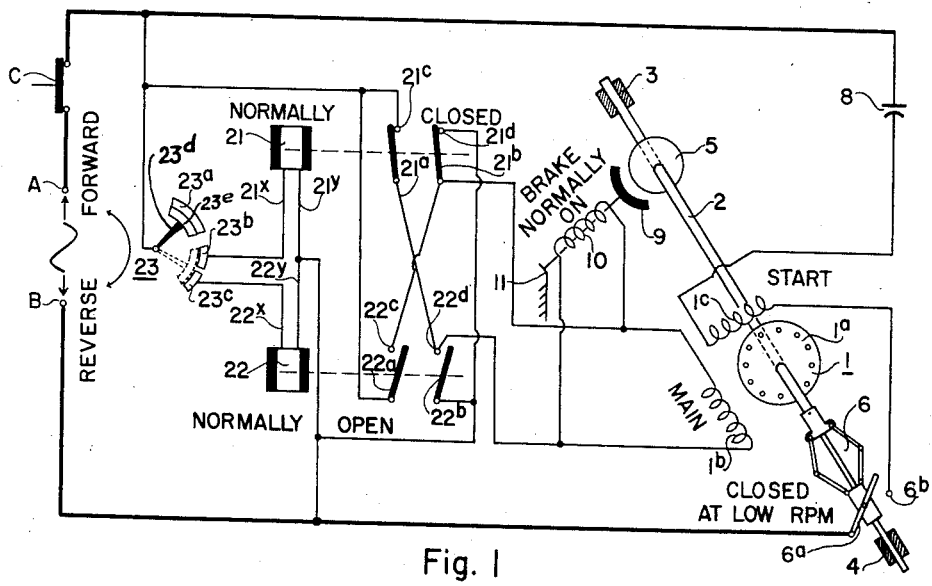
Figure 1 is a schematic diagram showing a reversing circuit applied to a motor having a speed-responsive centrifugal switch comprising the starting winding cut-out, and the diagram showing means whereby reversing relays can be operated in sequence, this means being applied in the electrical circuit of the relay actuating windings.

In the two figures of the drawing, like reference characters are applied to similar components. In each of these figures, the supply line circuit is connected through the terminals A and B to an alternating current source, not shown, and a supply line controller C is connected in series with one side of the line.

The electric motor 1 as schematically shown includes an armature 1a, a main winding 1b and a starting winding 1c, these windings being conventional and being mutually displaced in space by an angle of 90°. The motor further includes a shaft 2 supported in bearings 3 and 4.

Figure 2:
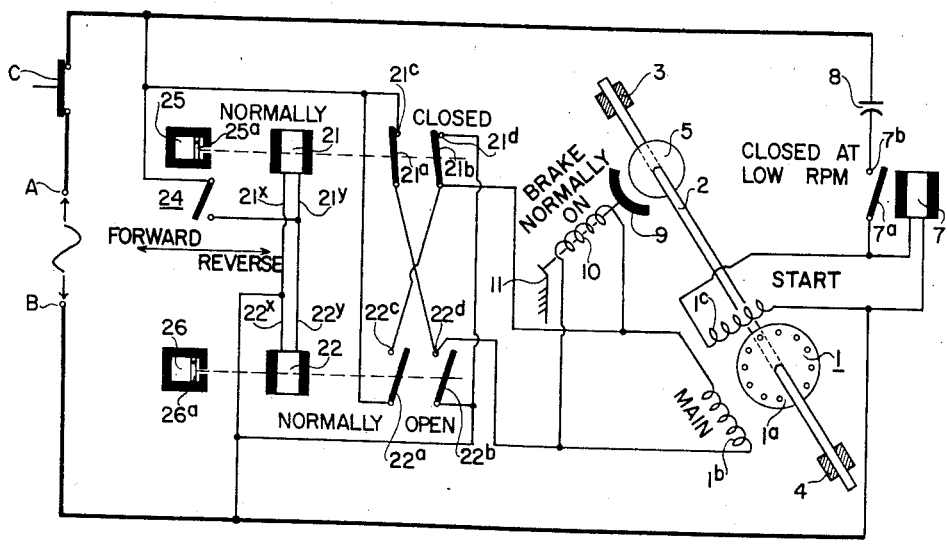
Fig. 2 is a circuit diagram similar to Fig. 1, but showing a reversing circuit applied to a motor having a speed-responsive relay in the starting winding circuit and comprising the cut-out, and this diagram showing relays in which their windings are simultaneously electrically energized but in which mechanical delay means are provided to provide the sequential action of the motor reversing steps.

A speed-responsive cut-out is included with each of the motors shown in Figs. 1 and 2. The speed-responsive control in Fig. 1 comprises a centrifugal switch 6 having an arm 6a connected to one side of the power line and having a contact terminal 6b connected to one end of the starting winding 1c. In Fig. 2, the motor is similar to that shown in Fig. 1 except that no centrifugal switch is included, but instead an electrical relay 7 is employed, this relay being responsive to the drop across the starting winding 1c, as is well known in the prior art, and the relay 7 including an arm 7a connected with the starting winding and a contact 7b operatively associated with the arm 7a and connected to the other side of the power line. The starting circuit of the motor also includes a series reactance in the form of a condenser 8 which serves the well-known purpose of shifting the phase of the current through the starting winding when the speed-responsive cut-out means is closed. It is to be noted that the starting winding, speed-responsive cut-out, and the capacitor form the starting circuit of the motor and are always connected across the power line when the controller C is closed.

The circuits of Figs. 1 and 2 each include a mechanical brake comprising a drum 5, a brake shoe 9, a solenoid actuator 10 and spring means 11 normally urging the brake shoe into contact with the drum 5 for the purpose hereinafter stated. The two ends of the solenoid coil 10 are connected in parallel across the main winding 1b of the motor so that whenever the main winding 1b is energized, the solenoid 10 is energized, thereby retracting the shoe 9 from the drum 5 and maintaining the brake in released condition. However, when the main winding 1b is de-energized during reversal the solenoid 10 is deenergized and the spring 11 presses the brake shoe 9 against the drum 5 and thereby imparts braking action to the motor shaft 2 tending to stall the latter.

Figs. 1 and 2 further illustrate reversing means connected between the power line and the main winding 1b. In both embodiments illustrated in the drawing, two separate relays are employed, the upper relay 21 having two arms 21a and 21b opposite relay contacts 21c—21d, the relay 21 being of the normally-closed type. The lower relay 22 comprises arms 22a and 22b which cooperate respectively with contacts 22c and 22d, this relay being of the normally-open type. The relay 21 includes an actuating winding having leads 21x and 21y, the winding of the relay 22 having leads 22x and 22y.

In the circuit shown in Fig. 1, the leads 21y and 22y of the relays are connected together and in turn connected to one side of the power line. The leads 21x and 22x are connected to segments 23b and 23c respectively of a reversal control switch 23. This switch has a wiper arm 23d with a contact segment 23e mounted at its outer end. In the position of the switch 23 shown in solid lines in Fig. 1, the wiper segment 23e is in contact with the contact segment 23a which is an open-circuit. Thus, in this position neither relay is energized by having the other side of its winding connected to the other side of the power line. If the wiper arm 23d is moved downwardly, the wiper segment 23e will make contact with the segment 23b and thus energize the relay 21 while leaving relay 22 still de-energized. In this position, the normally closed relay 21 is opened so that both relays are open and the main winding 1b is de-energized.

When the wiper arm 23d is then advanced further in a downward direction to the position shown in dotted lines in Fig. 1, the wiper segment 23e will then contact both segments 23b and 23c so that the actuating windings in both relays 21 and 22 will be energized. At this time, the contacts of relay 21 will be held open and the contacts of relay 22 will be closed.

The relay arms and associated contacts are cross-connected both in Fig. 1 and in Fig. 2 and these cross-connected contacts are in turn connected to the power line. When both relays are de-energized, the relay 21 is closed and the winding 1b is connected across the line so that the main winding has one phase relation with respect to the starting winding circuit. However, when both relays are energized, relay 21 is open and relay 22 is closed and the main winding is connected across the power line in the opposite phase relation with respect to the circuit of the starting winding 1a, which is never reversed with respect to the power line.

The switch 23 is shown for the purpose of broadly illustrating a relay control means which operates entirely in the actuating-winding circuits of the relays, and by which control means the relays may be caused to function in such succession that the main winding will be first energized in one direction, then de-energized for an interval of time, and then re-energized in the opposite phase relation with respect to the starting winding circuit. The switch 23 is intended merely to show a schematic representation of a control means for accomplishing this purpose, it being understood that other control means in the circuits of the actuating windings of the relays 21 and 22 are contemplated within the scope of the present invention such control means, for example, including electrical delay circuits for operating the relays in the same sequence in which they can be operated manually by the switch 23.

In Fig. 2, the actuating windings of the relays 21 and 22 are connected in parallel, and one side of the paralleled windings is connected to one side of the power line directly. The other side of the paralleled windings is connected to a switch 24 which is, in turn, connected to the opposite side of the power line so that when the switch 24 is closed the windings of both relays 21 and 22 are connected across the power line, and both relays are accordingly energized. These relays control the main motor winding 1b in the same manner as the relays in Fig. 1 such that when both relays are de-energized, the main winding is connected across the line in one phase relation with respect to the starting winding 1c, and when both relays are energized by closing the switch 24 the main winding 1b is connected across the power lines in the opposite phase relation with respect to the starting winding 1c.

However, the delay means in Fig. 2 which provides an interval of time during which the main winding 1b is de-energized differs from that shown in Fig. 1. This difference is schematically illustrated by the addition of two dash-pots 25 and 26, which dash-pots are respectively connected with the arms 21a—21b of the relay 21 and to the arms 22a—22b of the relay 22. The dash-pot 25 resists rapid motion to the right in Fig. 2, and the dash-pot 26 resists rapid motion to the left. Thus, when switch 24 is closed the arms 21a—21b move to the open position but the arms 22a—22b move toward the respective contacts 22c—22d at a metered rate which is determined by the drag of the dash-pot 26. The reverse is true when the switch 24 is reopened thereby de-energizing the windings of the relays 21—22. In this case the arms 22a—22b open, but the arms 21a—21b travel toward the respective contacts 21c—21d at a metered rate as determined by the drag of the dash-pot 25. In this manner, whether the relays are opening or closing, there always exists an interval of delayed relay motion during which the main winding is de-energized. Although dash-pots are illustrated in Fig. 2, it is to be understood that they are intended to schematically represent a plurality of possible mechanical means including features of the structures of the relays 21 and 22 themselves by which a brief interval delay during reversing of the motor may be provided. Whatever means is employed to provide this delay, the interval thereof during which the main winding is de-energized and during which the brake solenoid 10 is de-energized so that the brake is applied to the drum 5, should approximately equal the length of time required for the brake to slow the motor down to the point at which the speed-responsive cut-out means 6 (or 7) closes to reconnect the starting winding across the power line. Until the speed-responsive switch has connected the starting winding across the power line again as the motor slows down, there is no advantage in re-connecting the main winding to the power line.

The present invention is not to be limited to the illustrative embodiments shown in the drawing, for obviously changes may be made therein within the scope of the appended claims.

I claim:

1. In combination with an electric motor having a shaft, having a main winding and having a starting circuit including a starting winding and including speed-responsive cut-out means in series with said starting winding; the starting circuit being continuously connected with the same polarity across a single phase supply line, fast reversing means comprising a mechanical brake operatively connected with the motor shaft for normally braking rotation thereof; polarity reversing means connected between said line and said main winding, said reversing means changing the connection of the main winding from closed-circuit of one polarity through open-circuit to closed-circuit of opposite polarity with respect to the polarity of the starting circuit; and brake control means comprising a solenoid actuator having a winding connected in parallel with said main winding, the brake being retracted and released when the main winding is energized from said supply line.

2. In a combination as set forth in claim 1, said polarity reversing means comprising relay means having at least two stable positions providing mutually opposite polarities of the main winding with respect to the starting winding; and selector control means for actuating said relay means to change positions.

3. In a combination as set forth in claim 2, said relay means comprising a normally closed relay for connecting the main winding to the line with one polarity; and a normally open relay for connecting the main winding to the line with the opposite polarity, said selector control means energizing said relays simultaneously from their normal positions.

4. In a combination as set forth in claim 3, said relays each having an operating time including a definite interval during which the relays are moving from normal position to energized position, and this interval being at least as great as the time required for the motor to be slowed down by said brake to the speed at which the cut-out means recloses.

5. In a combination as set forth in claim 4, each relay having mechanical delay means to slow its movement and provide means for determining said interval.

6. In combination with an electric motor having a shaft, having a main winding and having a starting circuit including a starting winding and including speed-responsive cut-out means in series with said starting winding, the starting circuit being connected across a single phase supply line, fast reversing means comprising a mechanical brake operatively connected with the motor shaft for braking rotation thereof; polarity reversing means connected between said line and said main winding, said reversing means changing the connection of the main winding from closed-circuit of one polarity through open-circuit to closed-circuit of opposite polarity with respect to the polarity of the starting circuit; delay means associated with said reversing means for retaining the latter in open-circuit condition for a predetermined interval of time; and brake control means connected with said reversing means to actuate the brake when the main winding is deenergized and release the brake when the main winding is energized from said supply line.

7. In a combination as set forth in claim 6, said polarity reversing means comprising relay means having at least two stable positions providing mutually opposite polarities of the main winding with respect to the starting winding, and said delay means providing a hesitation of said relay means between said stable positions.

8. In a combination as set forth in claim 7, said interval of hesitation being at least as great as the time required for the motor to be slowed down by said brake to the speed at which the cut-out means recloses.

9. In a combination as set forth in claim 7, said relay means comprising a normally closed relay for connecting the main winding to the line with one polarity; and a normally open relay for connecting the main winding to the line with the opposite polarity; and selector control means simultaneously for energizing said relays from their normal positions.

10. In a combination as set forth in claim 9, said relays each having a characteristic operating time including a definite interval during which the relays are moving from normal position to energized position, and this interval being at least as great as the time required for the motor to be slowed down by said brake to the speed at which the cut-out means recloses.

References Cited in the file of this patent

UNITED STATES PATENTS

| 2,274,175 | Whitcomb | Feb. 24, 1942 |
| 2,376,299 | Wendelburg et al. | May 15, 1945 |